(12) United States Patent
Freeman et al.

(10) Patent No.: US 10,154,076 B2
(45) Date of Patent: Dec. 11, 2018

(54) IDENTIFYING USERS THROUGH A PROXY

(75) Inventors: Timothy S. Freeman, Sunnyvale, CA (US); Mark S. Kolich, Los Altos, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 1041 days.

(21) Appl. No.: 13/270,512

(22) Filed: Oct. 11, 2011

(65) Prior Publication Data

US 2013/0091305 A1  Apr. 11, 2013

(51) Int. Cl.
*H04L 29/08* (2006.01)

(52) U.S. Cl.
CPC ............ *H04L 67/02* (2013.01); *H04L 67/306* (2013.01); *H04L 67/327* (2013.01)

(58) Field of Classification Search
CPC ...... H04L 67/28; H04L 63/0281; H04L 67/22
USPC .......................................... 709/246, 203, 224
See application file for complete search history.

(56) References Cited

U.S. PATENT DOCUMENTS

| | | | | |
|---|---|---|---|---|
| 6,009,441 | A * | 12/1999 | Mathieu ................... | G06F 17/21 707/E17.118 |
| 2002/0010776 | A1 * | 1/2002 | Lerner ........................... | 709/225 |
| 2002/0078233 | A1 * | 6/2002 | Biliris et al. ................... | 709/238 |
| 2002/0143981 | A1 * | 10/2002 | DeLima ................ | H04L 41/147 709/233 |
| 2002/0165967 | A1 * | 11/2002 | Morgan ......................... | 709/227 |
| 2002/0184527 | A1 * | 12/2002 | Chun et al. ................... | 713/201 |
| 2003/0023754 | A1 * | 1/2003 | Eichstadt .......... | G06F 17/30873 709/246 |
| 2003/0053420 | A1 * | 3/2003 | Duckett .............. | G06F 11/3495 370/252 |
| 2003/0163370 | A1 * | 8/2003 | Chen et al. ...................... | 705/14 |
| 2004/0128285 | A1 * | 7/2004 | Green ............... | G06F 17/30864 |
| 2006/0031404 | A1 | 2/2006 | Kassab et al. | |
| 2006/0101514 | A1 * | 5/2006 | Milener et al. ................. | 726/22 |
| 2006/0282662 | A1 | 12/2006 | Whitcomb | |
| 2007/0143469 | A1 * | 6/2007 | Adams et al. ................ | 709/224 |
| 2009/0019148 | A1 * | 1/2009 | Britton ................... | G06Q 30/02 709/224 |
| 2009/0177771 | A1 | 7/2009 | Britton et al. | |

(Continued)

FOREIGN PATENT DOCUMENTS

| | | |
|---|---|---|
| GB | 2425194 | 10/2006 |
| WO | WO0079449 | 12/2000 |

OTHER PUBLICATIONS

Souders, Evolution of Script Loading, Dec. 6, 2010, http://www.stevesouders.com/blog/2010/12/06/evolution-of-script-loading/, accessed Nov. 16, 2015.*

(Continued)

*Primary Examiner* — Suraj M Joshi
*Assistant Examiner* — Sherman Lin

(57) ABSTRACT

Methods, systems, and computer-readable media with executable instructions stored thereon for identifying a user that accesses a webpage from a user device through a proxy are provided. Identifying users through a proxy can include providing rewritten content of the webpage accessed by the user to the user device, the rewritten content including a reference to a data file, and the reference including a checksum computed from actual content of the webpage. The user can be associated with the actual content of the webpage in response to receiving a file request for the data file from the user device.

17 Claims, 6 Drawing Sheets

(56) References Cited

U.S. PATENT DOCUMENTS

2009/0307748 A1* 12/2009 Blom .................. G06F 21/31
                                                        726/2
2013/0080498 A1* 3/2013 Desilva ............... H04L 67/22
                                                        709/201

OTHER PUBLICATIONS

Crenshaw, Web Buggery: Analyzing Tracking Images, published Jul. 28, 2009, http://www.irongeek.com/i.php?page=security/webbugs, accessed on Sep. 23, 2017.*

* cited by examiner

IDENTIFYING USERS THROUGH A PROXY

BACKGROUND

A user's web browsing history is a rich data source representing a user's implicit and explicit interests and intentions. A user's web browsing history can contain information at varying levels of abstraction about the user's ongoing tasks, which makes it a valuable resource. A user's harvested web browsing history can be used to personalize webpages that the user visits.

DETAILED DESCRIPTION

Figure 1A:
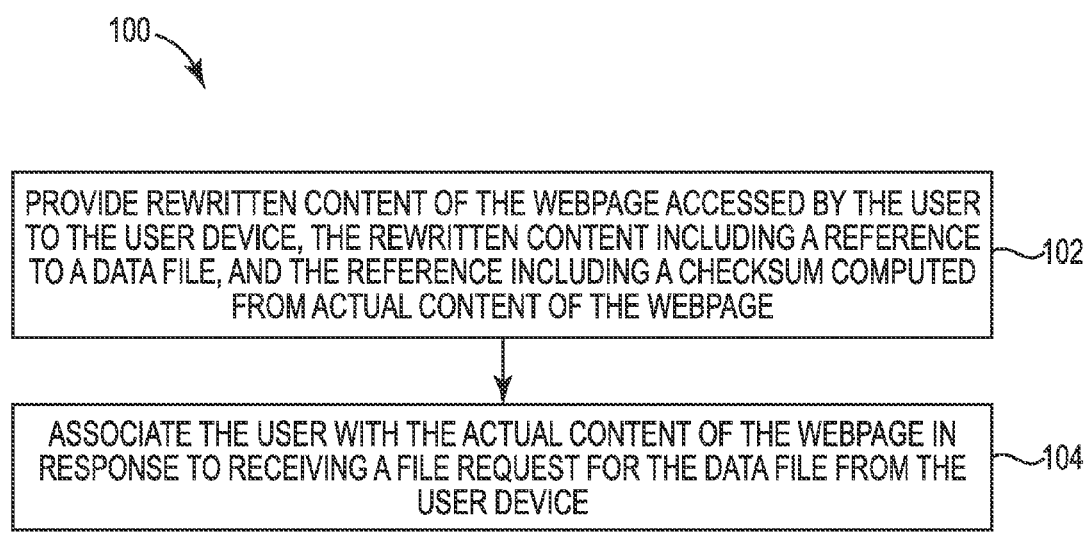
FIG. 1A is a flow chart illustrating an example of a method for identifying a user that accesses a webpage from a user device through a proxy.

Examples of the present disclosure include methods, systems, and computer-readable media with executable instructions stored thereon for identifying a user that accesses a webpage from a user device through a proxy. can include providing rewritten content of the webpage accessed by the user to the user device, the rewritten content including a reference to a data file, and the reference including a checksum computed from actual content of the webpage. The user can be associated with the actual content of the webpage in response to receiving a file request for the data file from the user device.

Users can voluntarily disclose his web browsing behavior to a third party so that the user's web browsing tendencies can be used to personalize the webpages visited. For example, a user can conduct research online regarding an upcoming vacation in the Caribbean. If the user has volunteered to disclose his web browsing history to a third party, ad services can place Caribbean vacation destinations in ad locations on web pages that the user visits. Such information can aid the user in finding a suitable Caribbean vacation.

For example, when a user enters a web address in his browser search bar he expects a specific webpage to show up on his browser. If a proxy is placed between the user/browser/user device and the ultimate webpage the user is requesting, the proxy, if designed to, can monitor and track the webpages requested by the user. In order to personalize future webpages the user visits, the proxy can associate the identity of the user with the content of the requested webpage. The proxy can identify the user with the web browsing history regardless of IP addresses, which can change frequently on certain devices (e.g., cell phones) and impede associating users to web browsing history. Further, user identification can be done by a proxy without monitoring Media Access Control (MAC) addresses, which, when network traffic passes through a router, generally identify the router and not the browser. Further, using a proxy to associate content of a web page with a user does not increase the traffic on the user device. Examples of the present disclosure can, for example, pertain to browsers that do not allow for configuration of a web proxy and specification of login credentials.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Similar elements or components between different figures can be identified by the use of similar digits. For example, 222 can reference element "22" in FIG. 2, and a similar element can be referenced as 322 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1A is a flow chart illustrating an example of a method 100 for identifying a user that accesses a webpage from a user device through a proxy. At 102, a rewritten content of the webpage accessed by the user is provided to the user device, the rewritten content includes a reference to a data file, and the reference includes a checksum computed from actual content of the webpage. In some examples, an access request for access to the webpage can be received at the proxy. The access request can include a Uniform Resource Locator (URL) of the webpage entered by the user into the user device. A user device can include a computing device and/or a mobile device (e.g., a cellular telephone and/or a personal digital assistant (PDA)), among others. In a number of examples, the user can use a browser (e.g., web browser) on the user device to access the webpage. A browser can include, but is not limited to, an application for retrieving, presenting, and traversing information resources on the Internet (e.g., World Wide Web). A proxy can be a server that is an intermediary for requests from a browser seeking resources from a webpage.

Actual content of the webpage can include a markup language of the text within the webpage. Examples of markup languages can include, but are not limited to, Hypertext Markup Language (HTML), Extensible Markup Language (XML), Extensible Hypertext Markup Language (XHTML), and/or lightweight markup languages, etc.

A checksum can include a fixed-size datum computed from a block of digital data such as the actual content of the webpage. An example of a checksum includes, but is not limited to, a 128-bit string of digits. The checksum can be computed by a checksum function or checksum algorithm. Examples of checksum algorithms can include, but are not limited to, parity byte or parity word, modular sum, position-dependent checksums, etc. The checksum calculated for the actual content of the webpage can be unique to that actual content. The proxy can compute one checksum per actual content of a webpage received. Because the checksum is unique to the actual content, the proxy can associate the checksum with the actual content of the webpage.

In an example, the rewritten content can include a script inserted into the actual content of the webpage that can cause the browser to make a file request. The script can be any form of script language. In an example, the script can include, but is not limited to, JavaScript.

In a number of examples, the data file can include an image file. Examples of image files can include, but are not limited to, graphics interchange format (GIF). In another example, the data file can be an image file that is not visible to the user. In one or more examples of the present disclosure, the data file can be an image file that is loaded on the browser asynchronously with the actual content of the webpage.

For example, the following HTML can represent actual content received by the proxy:

```
<html>
    <head>
    <title>Page at Example.com</title>
    </head>
    <body>
    <h1>Title of Page at Example.com</h1>
    </body>
</html>
```

In an example, the checksum and data file can be inserted into the document head. For example the checksum 'd41d8cd98f00b204e9800998ecf7427e' and file 'pixel.gif' can be inserted as follows:

```
<html>
<head><script type="text/javascript">
    (new Image).src=https://proxy-
harvester.com/pixel.gif?cs=d41d8cd98f00b204e9800998ecf7427e";
</script>
<title>Page at Example.com</title>
</head>
<body>
<h1>Title of Page at Example.com</h1>
</body>
</html>
```

In an example, the checksum and file can be inserted into the document body. For example, the checksum 'd41d8cd98f00b204e9800998ecf7427e' and file 'pixel.gif' can be inserted as follows:

```
<html>
<head>
<title>Page at Example.com</title>
</head>
<body><script type="text/javascript">
    (new Image).src=https://proxy-
harvester.com/pixel.gif?cs=d41d8cd98f00b204e9800998ecf7427e";
</script>
<h1>Title of Page at Example.com</h1>
</body>
</html>
```

In an example, the checksum can be inserted in both the head and the body of the actual content. Placing the checksum in the head, the body, or both the head and the body, can be based on a number of performance criteria. Performance criteria can include, but are not limited to, browser download rate of the rewritten content, available bandwidth of a user, bandwidth of the proxy, user preference, size of the content of the webpage, etc.

In an example, the access request can be sent from the proxy to a web server that includes the webpage. A web server can refer to the hardware or software that helps to deliver content that can be accessed through the Internet. A purpose of the web server can be to deliver content (e.g., web pages) in response to a request of a client, proxy, server, etc. In a number of examples, the file request can include the reference to the data file. In some examples, the file request can include a cookie that identifies the user. A cookie can include a data store that associates requests direct to the proxy. In an example, the cookie is unique to the user. For example, each user accessing a webpage can have a unique cookie related specifically to the user.

At 104, the user can be associated with the actual content of the webpage in response to receiving a file request for the data file from the user device. In one or more examples of the present disclosure, the file request can be initiated by a script included in the rewritten content. In an example, the file request can include the checksum. In a number of examples, the proxy can send the data file requested to the user device. In an example, the actual content of the webpage can be inferred from the checksum included in the file request. For example, the checksum can be associated with the actual content of a webpage when the checksum is the rewritten content of the webpage.

Figure 1B:
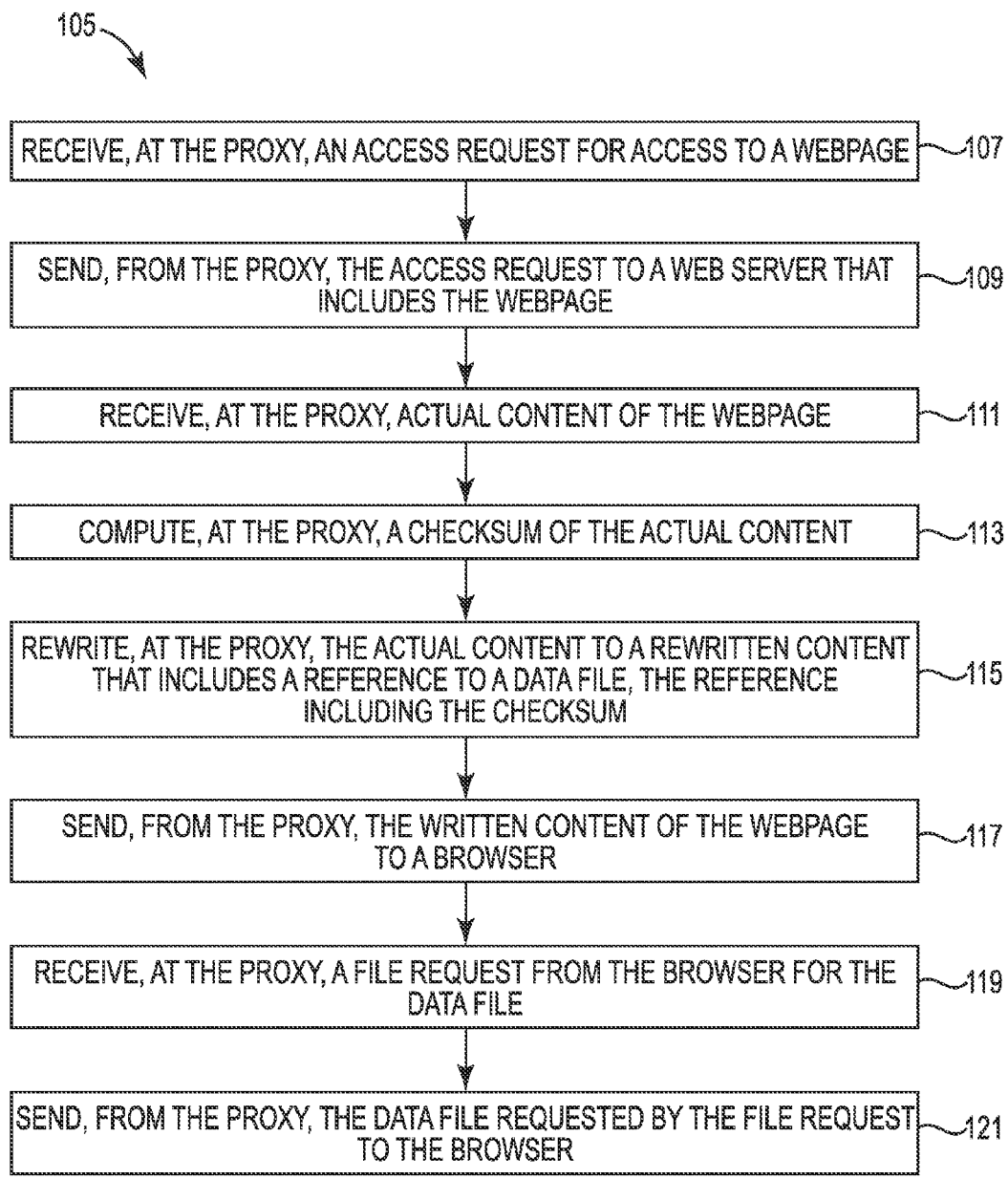
FIG. 1B is a flow chart illustrating an example of a method for identifying a user that accesses a webpage from a user device through a proxy.

FIG. 1B is a flow chart illustrating an example of a method 105 for identifying a user that accesses a webpage from a user device through a proxy. At 107, an access request for access to a webpage is received at a proxy. At 109, the access request is sent from the proxy to a web server that includes the webpage. At 111, the proxy receives actual content of the webpage requested. At 113, a checksum of the actual content is computed at the proxy. At 115, the proxy rewrites the actual content to a rewritten content that includes a reference to a data file, where the reference includes the checksum. At 117, the proxy sends the rewritten content of the webpage that includes the checksum to a browser.

The proxy receives a file request at 119 from the browser for the data file. In a number of examples of the present disclosure, the file request can be initiated by the script included in the rewritten content. In an example, the file request can include the checksum. In response to the file request, the proxy sends the data file requested by the file request to the browser at 121. In a number of examples of the present disclosure, the cookie can identify the user is assigned via the user logging the user into the proxy.

Figure 2:
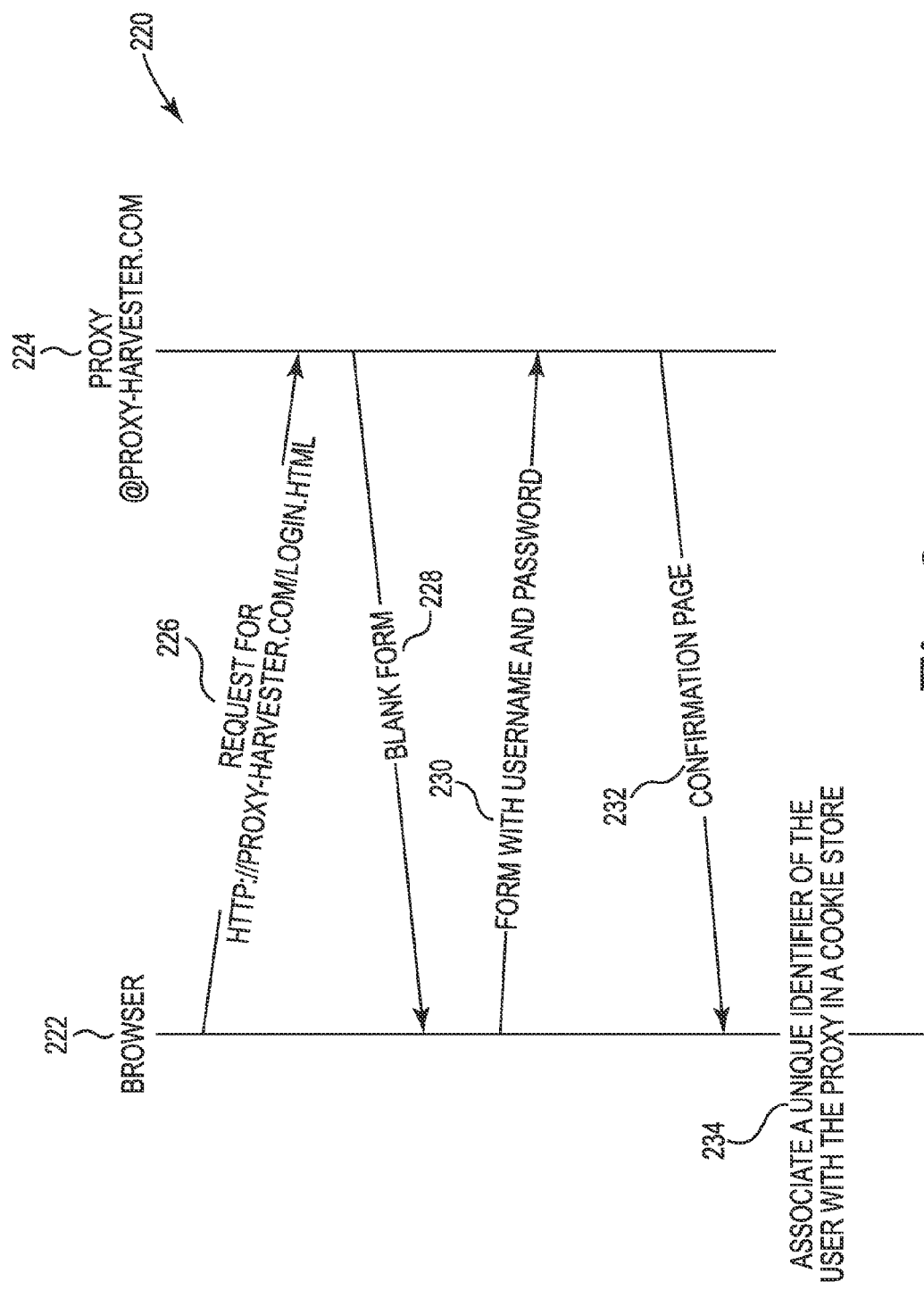
FIG. 2 is a flow chart illustrating an example of a method for logging a user into a proxy for a user that accesses a webpage from a user device through the proxy.

FIG. 2 is a flow chart illustrating an example of a method 220 for logging a user into a proxy for identifying a user that accesses a webpage from a user device through a proxy. FIG. 2 increases in time as moving down the diagram.

In an example, a user can log into a proxy 224 through a browser 222 on a user device so the proxy 224 can associate webpage content with the user. At 226, the proxy receives a log-in request from the browser 222. The log-in request, for example, can be a request for a webpage http://proxy-harvestercom/login.html. In return, the proxy 224 sends a blank form to the browser 222, at 228. The form can, for example, include a blank(s) for a user to enter her username and a blank for her to enter his corresponding password. The proxy 224, at 230, accepts the form with the username and password form the user of the browser 222. If the username and the password are a correct pair, the proxy 224, at 232, provides a confirmation page to the user at the browser 222.

A correct username and password pair can include a username that is associated with a password within the proxy. At 234, the browser 222 associates, in a cookie store of the browser 222, a unique identifier of the user with the proxy 224. In an example, the unique identifier can be within a cookie. In an example, the rewritten content can be provided to the user without identifying the user and without associating the user with the actual content, when the cookie is erased by the user.

Figure 3:
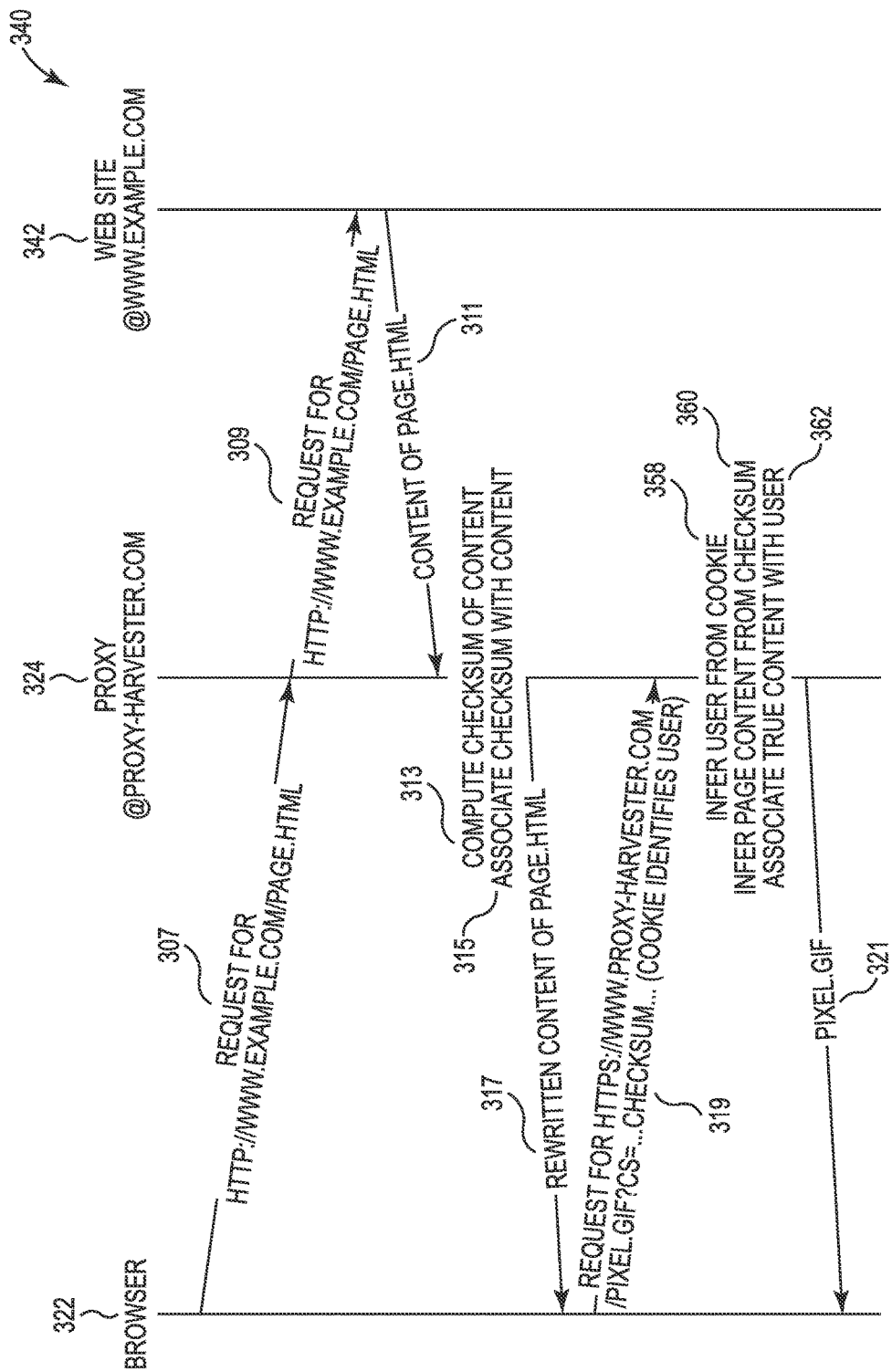
FIG. 3 is a flow chart illustrating an example of a method for identifying a user that accesses a webpage from a user device through a proxy.

FIG. 3 is a flow chart illustrating an example of a method 340 for identifying a user that accesses a webpage from a user device through a proxy. Method 340 is an example of a method for identifying a user of browser 322 on a user device that has logged in (e.g., FIG. 2, 220) to proxy 324 to access a webpage within website 342. At 307, an access request from browser 322 for access to a webpage (e.g., http://www.example.com/page.html) within website 342 is received at a proxy 324. At 309, the access request is sent to the website 342 from the proxy 324.

At 311, the proxy 324 receives actual content of the website 342 requested. A checksum of the actual content is computed at the proxy 324, at 313. The proxy 324 associates the computed checksum with the actual content, at 315. At 315, the proxy 324 can rewrite the actual content to a rewritten content that includes a reference to a data file, where the reference includes the checksum. The proxy 324 sends the rewritten content to the browser 322, at 317. As noted herein, the rewritten content can include a script that causes the browser to make the file request.

At 319, the proxy 324 receives a file request from the browser that includes the checksum. The checksum can be encoded as a form variable, as illustrated in FIG. 3, 319. For example, a form variable can include, but is not limited to, a form variable appearing in the URL or a form variable appearing in a POST body. The checksum can, in an example, be encoded in the path of the URL (e.g., https://www.proxy-harvester.com/ . . . checksum . . . /pixel.gif). Because the user has logged into the proxy the file request 319 can also include, with the HTTP request, a cookie that identifies the user of the browser 322. The proxy 324, at 358, infers the identity of the user of the browser 322 from the cookie in the file request 319. The proxy 324 can also infer the actual content of the webpage within website 342, at 360, from the checksum in the file request 319. At 362, the proxy 324 associates the actual content of the webpage within website 342 with the user of the browser 322. This content to user association can be stored and used in personalization of future web pages the user visits. At 321, the proxy 324 sends the requested file (e.g., pixel.gif) to the browser 322. In an example, the file is loaded on the browser 322 asynchronously with the content of the webpage 340.

Figure 4:
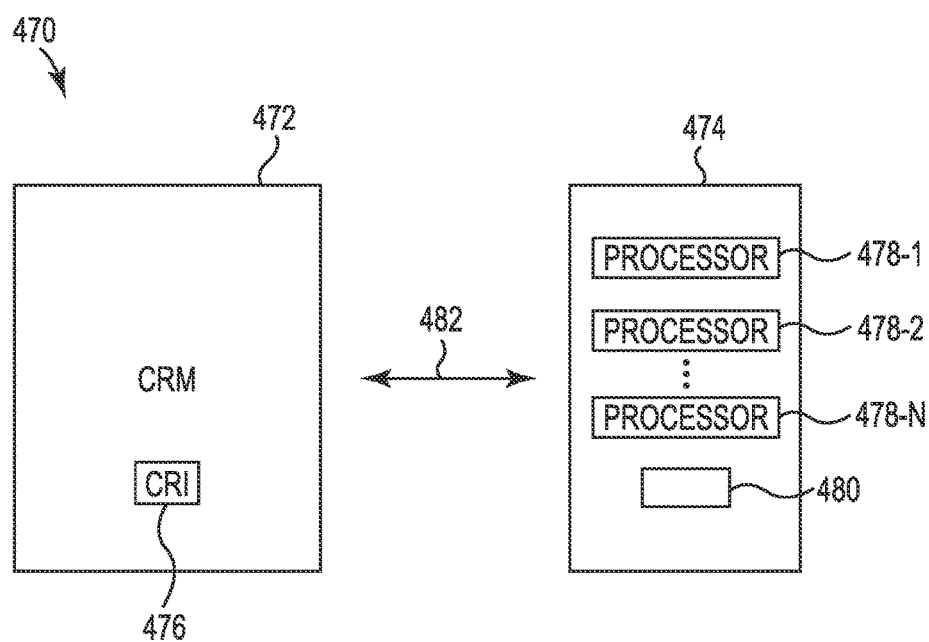
FIG. 4 illustrates a block diagram of an example of a computer-readable medium in communication with processing resources for identifying a user that accesses a webpage from a user device through a proxy.

FIG. 4 illustrates a block diagram 470 of an example of a computer-readable medium in communication with processing resources for identifying a user that accesses a webpage from a user device through a proxy according to the present disclosure. Computer-readable medium (CRM) 472 can be in communication with a computing device 474 having processor resources of more or fewer than 478-1, 478-2, . . . , 478-N, that can be in communication with, and/or receive a tangible non-transitory CRM 472 storing a set of computer-readable instructions 476 executable by one or more of the processor resources (e.g., 478-1, 478-2, . . . , 478-N) for identifying a user that accesses a webpage from a user device through a proxy as described herein. In a number of examples, processor resources 478-1, 478-2, . . . 478-N can be in a number of devices which can include memory resources 480, and the processor resources 478-1, 478-2, . . . , 478-N can be coupled to the memory resources 480. For example, the one or more devices including the processor resources 478-1, 478-2, . . . , 478-N and/or memory resources 480 can be in a cloud computing system (e.g., multiple devices in different locations).

Processor resources can execute computer-readable instructions 476 for identifying a user that accesses a webpage from a user device through a proxy that are stored on an internal or external non-transitory computer-readable medium 472. A non-transitory computer-readable medium (e.g., computer readable medium 472), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), flash memory, etc., as well as other types of CRM.

The non-transitory computer-readable medium 472 can be integral, or communicatively coupled, to a computing device, in either in a wired or wireless manner. For example, the non-transitory CRM can be an internal memory, a portable memory, a portable disk, or a memory located internal to another computing resource (e.g., enabling the computer-readable instructions to be downloaded over the Internet).

The CRM 472 can be in communication with the processor resources (e.g., 478-1, 478-2, . . . , 478-N) via a communication path 482. The communication path 482 can be local or remote to a machine associated with the processor resources 478-1, 478-2, . . . , 478-N. Examples of a local communication path 482 can include an electronic bus internal to a machine such as a computer where the CRM 472 is one of volatile, non-volatile, fixed, and/or removable storage medium in communication with the processor resources (e.g., 478-1, 478-2, . . . , 478-N) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 482 can be such that the CRM 472 is remote from the processor resources (e.g., 478-1, 478-2, . . . , 478-N) such as in the example of a network connection between the CRM 472 and the processor resources (e.g., 478-1, 478-2, . . . , 478-N). That is, the communication path 482 can be a network connection. Examples of such a network connection can include a local area network (LAN), a wide area network (WAN), a personal area network (PAN), and the Internet, among others. In such examples, the CRM 472 can be associated with a first computing device and the processor resources (e.g., 478-1, 478-2, . . . , 478-N) can be associated with a second computing device 474 (e.g., a Java application server).

Processor resources 478-1, 478-2, . . . , 478-N coupled to the memory 480 can log a user into a proxy. Further, processor resources 478-1, 478-2, . . . , 478-N can store a first association between a cookie and a user. The processors can, for example, store the first association in response to receiving login information from a user. A username and password of the user from the browser can be accepted. If the username and the password are a correct pair, a confirmation page that includes a cookie uniquely identifying the user can be provided to the user at the browser, where the browser can store the cookie in a cookie store. Processor resources 478-1, 478-2, . . . , 478-N can associate a cookie with the user. The checksum can be unique to the user.

Processor resources 478-1, 478-2, . . . , 478-N can, for example, store a second association between a webpage and a checksum computed from the webpage. For example, the processors can store the second association in response to receiving a request for the webpage. The second association can include an association between an actual content of the webpage and the checksum.

Processor resources 478-1, 478-2, . . . , 478-N coupled to the memory 480 can identify the user using the first association and the second association in response to receiving a file request that includes the checksum and the cookie. The file request can be caused by a script within the webpage. The requested file can be an image file that is loaded asynchronously with the actual content and is non-visible to the user.

Figure 5:
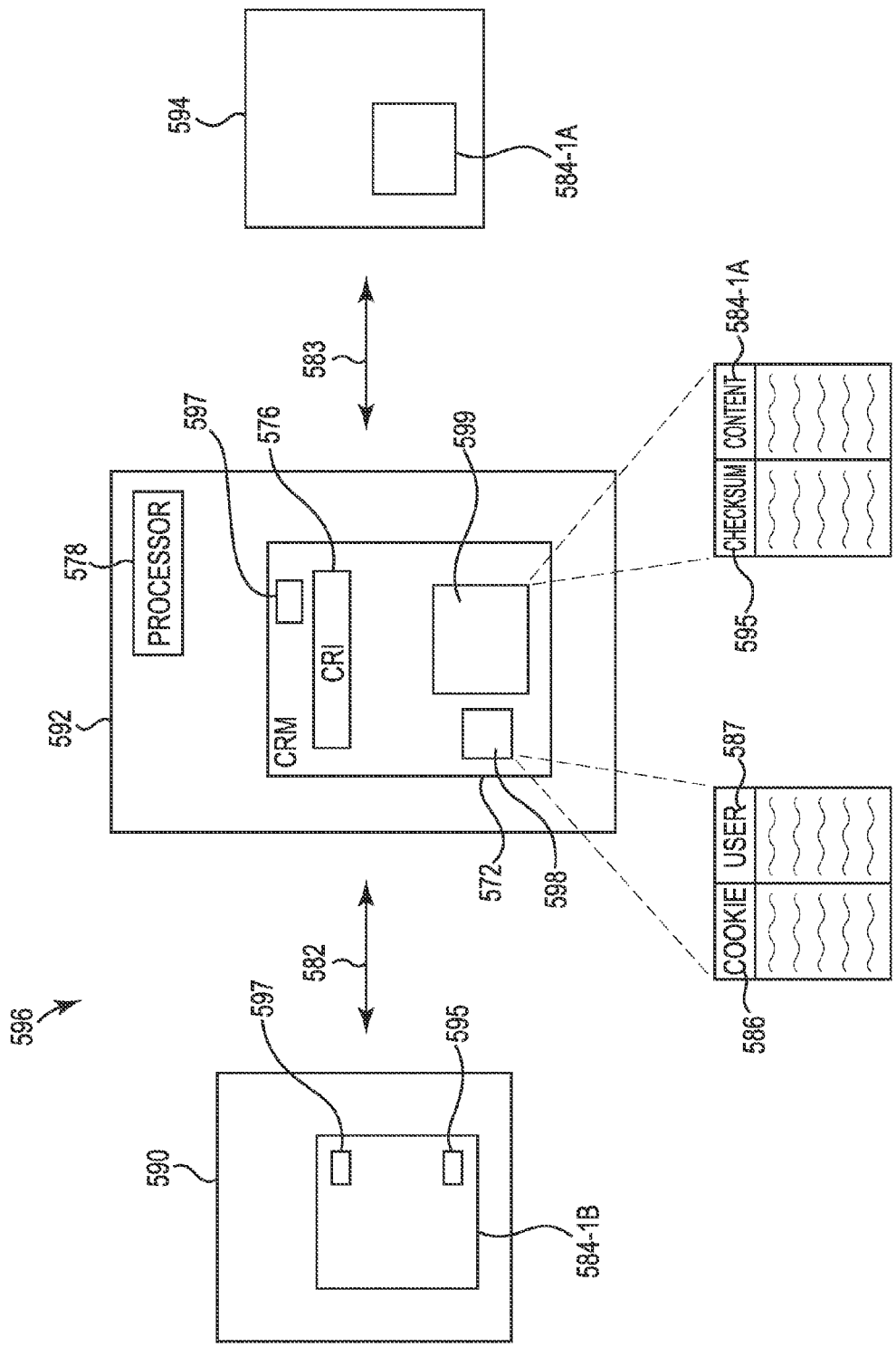
FIG. 5 illustrates an apparatus for identifying a user that accesses a webpage from a user device through a proxy.

FIG. 5 illustrates an apparatus 596 for identifying a user that accesses a webpage 584-1a from a user device 590 through a proxy 592. A user device 590 is in communication 582 with proxy 592. Proxy 592 includes a tangible non-transitory CRM 572 storing a set of computer-readable instructions (CRI) 576 executable by processor resources 578 for identifying a user that accesses a webpage 584-1a from a web server 594 through proxy 592 using a user device 590 as described herein. Computer-readable instructions (CRI) 576 can include instructions as discussed in connection with FIGS. 1A and 1B. At least one web server 594 is in communication 583 with proxy 592. Web server 594 stores webpage 584-1a. Webpage 584-1a includes the actual content of the webpage 584-1a.

For each user who logs into proxy 592, proxy 592 stores a cookie 586 along with user data 587 that identifies the user in a list 598. For example, a cookie 586 can include a data store that associates requests to the proxy and/or is unique to the user. The cookie can, for example, be associated with the user the first time the user logs into the proxy 592. List 598 maintains the unique cookie 586 associated with the user's user data 587 gathered over a number of log-ins.

The user device 590 sends a request through proxy 592 to access webpage 584-1a on web server 594. Web server 594 communicates webpage 584-1a via proxy 592. Proxy 592 rewrites the actual content of webpage 584-1a to a rewritten content webpage 584-1b and communicates the rewritten content webpage 584-1b, including the checksum 595, to the user device 590. The rewritten content webpage 584-1b includes a reference to a data file 597, where the reference includes a checksum 595 associated with the actual content webpage 584-1a and is sent to the user device 590 in response to the request for the webpage 584-1a. Proxy 592 stores the checksum 595 and corresponding actual content of webpage 584-1a in a list 599 for each request provided by each user represented by user data 587 [e.g., user data in cookie/user data list 598].

In response to the reference to the data file 597 in rewritten content webpage 584-1b, user device 590 sends a file request, including a cookie 586 that identifies the user and the checksum 595, to proxy 592. Proxy 592 associates the cookie 586 with user data 587 using table 598 and associates checksum 595 with content 584-1a using table 599. By doing so, proxy 592 associates content 584-1a with the user identified by user data 587.

Proxy 592, in response to the file request, also sends a data file 597 stored on proxy 592 to the user device 590. The data file 597 can, for example, be included in the header, body, and/or combinations thereof, of the content of the webpage 584-1b. In an example, the data file 597 is an image file not visible to the user of user device 590.

The above specification, examples, and data provide a description of the method and applications and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." The term "a number of" is meant to be understood as including at least one but not limited to one. The phrase "in an example," as used herein does not necessarily refer to the same example, although it can.

What is claimed:

1. A method comprising:
providing, through a proxy executed on a processor, rewritten content of a webpage accessed by a user to a user device, the rewritten content including a script inserted into the webpage, and a reference to a data file, the reference including a checksum computed at the proxy from actual content of the webpage, wherein the actual content of the webpage is based on a markup language of the webpage, and wherein the data file is loaded asynchronously with the actual content of the webpage;

determining, through the proxy, a location of the checksum based on a performance criterion, wherein the performance criterion includes at least one of a browser download rate of the rewritten content, available bandwidth of the user, bandwidth of the proxy, or a size of the actual content of the webpage;

receiving, at the proxy, a file request for the data file from the user device, the file request initiated by the script at the user device and including the checksum and a cookie that identifies the user; and associating, through the proxy, the identified user with the actual content of the webpage in response to receiving the file request for the data file from the user device.

2. The method of claim 1, further comprising inferring the actual content of the webpage from the checksum included in the file request.

3. The method of claim 1, wherein the file request includes the reference.

4. The method of claim 1, wherein the cookie that identifies the user is assigned via the user logging into the proxy.

5. The method of claim 1, further comprising providing the rewritten content to the user device without identifying the user and without associating the user with the actual content when the cookie is erased by the user.

6. The method of claim 1, wherein the reference to the data file causes the user device to make the file request.

7. The method of claim 1, wherein the data file is non-visible.

8. The method of claim 1, wherein the data file comprises image data, and the method further comprises:
   returning, by the proxy, the image data to the user device in response to the file request.

9. The method of claim 1, further comprising:
   receiving, at the proxy from the user device, an access request of the webpage;
   sending, by the proxy, the access request to a web server;
   receiving, at the proxy, the actual content of the webpage from the web server in response to the access request sent to the web server; and
   generate the rewritten content in response to receiving the actual content.

10. A non-transitory computer-readable medium including proxy instructions stored thereon that, when executed by one or more processors, cause the one or more processors to:
   store a first association between a cookie and a user;
   in response to receiving an access request for a webpage from a user device:
      generate rewritten content of the webpage in response to receiving actual content of the webpage, wherein the actual content of the webpage is based on a markup language of the webpage, and the rewritten content is generated by inserting a script and a reference to a data file into the webpage, the reference including a checksum computed by the proxy instructions from the actual content of the webpage;
      store a second association between the webpage and the checksum; and
      determine a location of the checksum based on a performance criterion, wherein the performance criterion includes at least one of a browser download rate of the actual content, available bandwidth of the user, bandwidth of the proxy, or a size of the content of the webpage; and
   receive a file request for the data file from the user device, the file request initiated by the script at the user device, the file request including the checksum and the cookie that identifies the user; and
   identify the user using the first association and the second association in response to receiving the file request.

11. The non-transitory computer-readable medium of claim 10, wherein the proxy instructions cause the one or more processors to store the first association in response to receiving login information from a user.

12. The non-transitory computer-readable medium of claim 10, wherein the data file referenced by the reference is an image file that is loaded asynchronously with the actual content and is not visible to the user.

13. The non-transitory computer-readable medium of claim 10, wherein the proxy instructions cause the one or more processors to send the data file to the user device in response to the file request.

14. The non-transitory computer-readable medium of claim 13, wherein the data file comprises image data.

15. A system comprising:
   a processor; and
   a non-transitory storage medium storing instructions executable on the processor to:
      log a user into a proxy;
      receive an access request at the proxy for access to a webpage;
      send the access request to a web server that includes the webpage;
      receive actual content of the webpage, wherein the actual content of the webpage is based on a markup language of the webpage;
      compute a checksum of the actual content at the proxy;
      rewrite the actual content to a rewritten content that includes a script and a reference to a data file, the reference including the checksum, and wherein the data file is loaded asynchronously with the actual content of the webpage;
      send from the proxy, the rewritten content of the webpage to a browser;
      receive a file request including the checksum and a cookie that identifies the user from the browser for the data file, wherein the script included in the rewritten content causes the browser to make the file request; and
      send the data file requested by the file request to the browser.

16. The system of claim 15, wherein the instructions are executable on the processor to use the actual content of the webpage to personalize a number of webpages visited by the user.

17. The system of claim 15, wherein the data file comprises image data, and the image data is returned to the browser in response to the file request.

* * * * *